(12) United States Patent
Son et al.

(10) Patent No.: US 8,502,459 B2
(45) Date of Patent: Aug. 6, 2013

(54) DRIVER IC FOR ELECTRICAL LOAD AND DRIVING METHOD THEREOF

(75) Inventors: Young Suk Son, Daejeon-si (KR); Tae Kyu Nam, Incheon-si (KR); Won Suk Jang, Gunpo-si (KR); Hyung Seog Oh, Daejeon-si (KR)

(73) Assignee: Silicon Works Co., Ltd., Daejeon-Si (KR)

( * ) Notice: Subject to any disclaimer, the term of this patent is extended or adjusted under 35 U.S.C. 154(b) by 264 days.

(21) Appl. No.: 13/095,572

(22) Filed: Apr. 27, 2011

(65) Prior Publication Data

US 2011/0266962 A1 Nov. 3, 2011

(30) Foreign Application Priority Data

Apr. 29, 2010 (KR) .................. 10-2010-0040109

(51) Int. Cl.
*H05B 41/36* (2006.01)
*H05B 37/02* (2006.01)

(52) U.S. Cl.
USPC ......... 315/185 R; 315/192; 315/297; 315/307

(58) Field of Classification Search
USPC ............. 315/185 R, 186, 192, 291, 297, 307, 315/308, 312
See application file for complete search history.

(56) References Cited

U.S. PATENT DOCUMENTS

| | | | | |
|---|---|---|---|---|
| 7,777,704 | B2* | 8/2010 | S et al. | 345/82 |
| 8,072,153 | B2* | 12/2011 | Liu | 315/185 R |
| 2009/0015759 | A1* | 1/2009 | Honbo | 349/69 |
| 2009/0230891 | A1* | 9/2009 | Zhao et al. | 315/308 |
| 2009/0284178 | A1* | 11/2009 | Jessenig et al. | 315/297 |
| 2011/0037396 | A1* | 2/2011 | Chien et al. | 315/185 R |
| 2011/0273104 | A1* | 11/2011 | Uchimoto et al. | 315/210 |
| 2012/0139439 | A1* | 6/2012 | Chang et al. | 315/291 |
| 2012/0187858 | A1* | 7/2012 | Omi et al. | 315/224 |

\* cited by examiner

*Primary Examiner* — Don Le
(74) *Attorney, Agent, or Firm* — Kile Park Reed & Houtteman PLLC

(57) ABSTRACT

A driver IC for electrical loads, suitable for regulating a driving voltage depending upon a feedback signal and supplying a regulated driving voltage to a power supply line to which load strings are connected in parallel. The driver IC includes driving current sources respectively connected to the load strings through regulated voltage nodes and configured to supply driving current to the load strings in response to a control signal; sensing units configured to sense and output a minimum voltage among voltages of the regulated voltage nodes; a sample-and-hold circuit configured to sample, hold and output the minimum voltage in response to the control signal; and a comparator configured to compare an output voltage of the sample-and-hold circuit and a reference threshold voltage and generate the feedback signal.

12 Claims, 2 Drawing Sheets

DRIVER IC FOR ELECTRICAL LOAD AND DRIVING METHOD THEREOF

BACKGROUND OF THE INVENTION

1. Field of the Invention

The present invention relates to a driver IC for electrical loads which supplies electric power through an arrangement of current sources, and more particularly, to a driver IC for electrical loads which can sample, hold and feed back a lowest voltage among voltages dropped at both ends of respective current sources when a power supply voltage is supplied to electrical loads connected in parallel, thereby supplying a regulated power supply voltage, and a driving method thereof.

2. Description of the Related Art

So far, a load driving device for driving electrical loads such as light emitting diodes (LED) by using a DC-DC conversion type power circuit, which generates a voltage different from a power supply voltage, has been used.

The power circuit generates predetermined output voltage and output current, and the load driving device for driving the electrical loads detects an input voltage or a supply voltage applied to the electrical loads or current flowing through the electrical loads and feeds back the voltage or current to a control unit for the power circuit. Thereafter, the feedback voltage or load current is compared with a reference value, and the output voltage or the output current from the power circuit is controlled in such a way as to be regulated.

In a portable electronic appliance such as a mobile phone and the like, it may be necessary to increase or decrease load current for driving loads, as the occasion demands. That is to say, in the case where the loads are light emitting elements, it may be necessary to regulate light emissions of the light emitting elements in such a way as to have optional values.

In this case, loss increases due to the presence of resistors for current detection as load current increases, and accordingly, a problem is caused in that the entire efficiency of an electronic appliance including a power circuit or loads is likely to deteriorate.

FIG. 1 is a view illustrating a conventional power supply apparatus for operating electrical loads.

Referring to FIG. 1, the conventional power supply apparatus for operating electrical loads includes current sources 1, 11 and 21, means 2, 12 and 22 for connection of light emitting diodes 3, 13 and 23, voltage tapping nodes 4, 14 and 24, comparators 5, 15 and 25, downstream transistors 7, 17 and 27, and a DC voltage regulator 10.

In the conventional power supply apparatus for operating electrical loads, the current sources 1, 11 and 21 are arranged in such a way as to supply power to the one or more light emitting diodes 3, 13 and 23 which are connected in parallel.

When a power supply voltage VDD is supplied to the one or more light emitting diodes 3, 13 and 23 which are connected in parallel, in order to regulate the power supply voltage VDD, voltages dropped due to the presence of the respective light emitting diodes 3, 13 and 23 are measured. Such dropped voltages are compared with a threshold voltage $V_f$.

As a result of the comparison, output signals of the transistors 7, 17 and 27 are generated. In the case where the dropped voltages are smaller than the threshold voltage $V_f$, the transistors 7, 17 and 27 are turned on, by which a feedback voltage supplied through a common signal line 8 is dropped.

At this time, the DC voltage regulator 10 performs a boosting operation and increases the power supply voltage VDD as an output voltage in such a manner that a minimum power supply voltage supplied to the light emitting diodes 3, 13 and 23 is maintained.

However, in the case where the dropped voltages are larger than the threshold voltage $V_f$, while the DC voltage regulator 10 does not perform a boosting operation, a voltage no smaller than a necessary minimum voltage is applied to the current sources 1, 11 and 21, by which power loss is caused. Also, due to such unnecessary power consumption, a problem occurs due to generation of heat.

SUMMARY OF THE INVENTION

Accordingly, the present invention has been made in an effort to solve the problems occurring in the related art, and an object of the present invention is to provide a driver IC for electrical loads which has a sample-and-hold circuit synchronized with a pulse width modulated signal to enable a stable operation at a low duty and can regulate a driving voltage through reinforcing and damping of current by using a comparator with a push-pull function, and a driving method thereof.

In order to achieve the above object, according to one aspect of the present invention, there is provided a driver IC for electrical loads, suitable for regulating a driving voltage depending upon a feedback signal and supplying a regulated driving voltage to a power supply line to which load strings are connected in parallel, the driver IC including: driving current sources respectively connected to the load strings through regulated voltage nodes and configured to supply driving current to the load strings in response to a control signal; sensing units configured to sense and output a minimum voltage among voltages of the regulated voltage nodes; a sample-and-hold circuit configured to sample, hold and output the minimum voltage in response to the control signal; and a comparator configured to compare an output voltage of the sample-and-hold circuit and a reference threshold voltage and generate the feedback signal.

In order to achieve the above object, according to another aspect of the present invention, there is provided a driver IC for electrical loads, including: one or more driving current sources having first terminals which are connected to a ground; one or more electrical loads having first terminals which are respectively connected to second terminals of the driving current sources; a power supply line connected to second terminals of the electrical loads; one or more regulated voltage nodes respectively commonly connected to the first terminals of the electrical loads and the second terminals of the driving current sources; one or more diodes having first terminals which are respectively connected to the regulated voltage nodes; a feedback line to which second terminals of the diodes are connected; a sample-and-hold circuit configured to sample and hold a signal inputted through the feedback line in response to a pulse width modulated control signal; a comparator configured to compare an output voltage of the sample-and-hold circuit and a reference threshold voltage and output a feedback signal; and a DC voltage regulator having an input terminal for receiving an input voltage, an output terminal for supplying a driving voltage for the electrical loads to the power supply line, and a feedback terminal for receiving the feedback signal.

A method for driving electrical loads includes the steps of: (a) supplying driving current for driving one or more electrical loads which are connected to a power supply line, by using one or more driving current sources; (b) sensing regulated voltages at both ends of the one or more electrical loads or the one or more driving current sources; (c) sampling and holding a minimum regulated voltage among one or more regulated voltages acquired in the step (b), by a sample-and-hold circuit in response to a pulse width modulated control signal; (d) comparing an output voltage of the sample-and-hold circuit with a reference threshold voltage and outputting a feedback signal; and (e) supplying a driving voltage to the power supply line by using an input voltage and the feedback signal.

BRIEF DESCRIPTION OF THE DRAWINGS

The above objects, and other features and advantages of the present invention will become more apparent after a reading of the following detailed description taken in conjunction with the drawings, in which:

FIG. 1 is a view illustrating a conventional power supply apparatus for operating electrical loads;

FIG. 2 is a view illustrating a driver IC for electrical loads in accordance with an embodiment of the present invention;

DETAILED DESCRIPTION OF PREFERRED EMBODIMENTS

Figure 3:
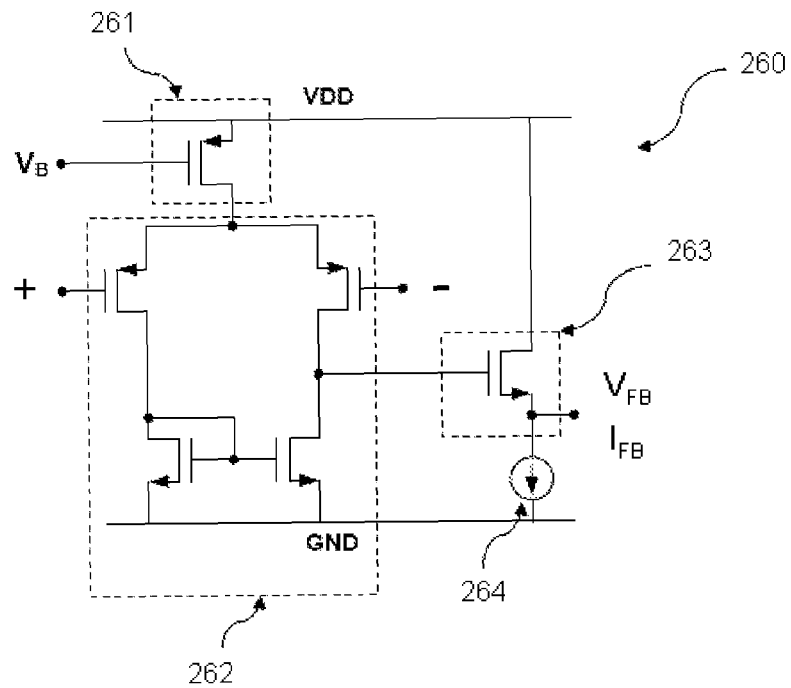
FIG. 3 is a view illustrating an exemplary embodiment of a comparator of the driver IC for electrical loads according to the embodiment of the present invention.

A key idea of the present invention is to provide a driver IC for electrical loads, which has a sample-and-hold circuit synchronized with a pulse width modulated signal, such that the voltage of a node having undergone a very large voltage drop at both ends of an electrical load or a driving current source is sampled and held and is compared with a reference threshold voltage by a comparator to allow a feedback voltage to be outputted and supplied to a DC voltage regulator, thereby being capable of regulating a driving voltage to be supplied to electrical loads, and a method for driving the same.

Reference will now be made in greater detail to a preferred embodiment of the invention, an example of which is illustrated in the accompanying drawings. Wherever possible, the same reference numerals will be used throughout the drawings and the description to refer to the same or like parts.

Figures 1, 2:
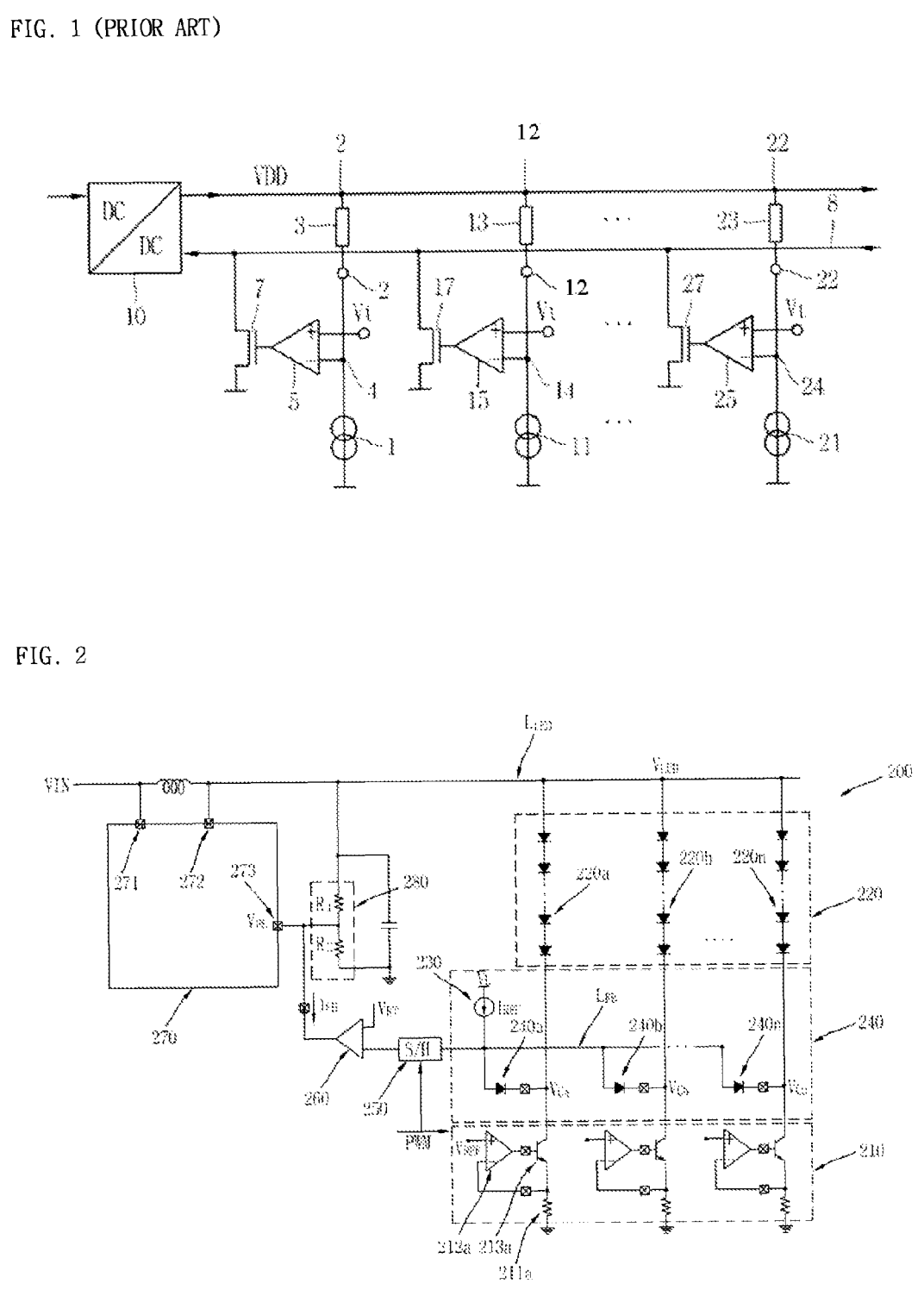

FIG. 2 is a view illustrating a driver IC for electrical loads in accordance with an embodiment of the present invention.

Referring to FIG. 2, a driver IC 200 for electrical loads in accordance with an embodiment of the present invention includes driving current sources 210, electrical loads 220, a power supply line $L_{LED}$, regulated voltage nodes $V_C$, sensing units 240, a feedback line $L_{FB}$, a sample-and-hold circuit 250, a comparator 260, and a DC voltage regulator 270.

The driving current sources 210 are connected to the electrical loads 220 and are configured to supply current to the electrical loads 220 in response to a pulse width modulated control signal PWM. Each of the driving current sources 210 includes a resistor 211a, a differential amplifier 212a, and a current source transistor 213a.

The resistor 211a has a first terminal which is connected to a ground. The differential amplifier 212a has an inverting terminal − to which a second terminal of the resistor 211a is connected and a non-inverting terminal + to which a reference voltage $V_{REF}$ is applied. The current source transistor 213a has a first terminal which is connected to the second terminal of the resistor 211a, a second terminal which is connected to the regulated voltage node $V_C$, and a control terminal to which the output of the differential amplifier 212a is inputted.

The electrical loads 220 may be realized in the type of diode strings 220a, 220b, . . . and 220n in each of which one or more light emitting diodes are connected in series. The electrical loads 220 may also be realized in the type of an array which includes red (R) light emitting diodes, green (G) light emitting diodes and blue (B) light emitting diodes.

The diode strings 220a, 220b, . . . and 220n may be connected in parallel to nodes on the power supply line $L_{LED}$, and a driving voltage $V_{LED}$ is commonly supplied to the diode strings 220a, 220b, . . . and 220n which are connected in parallel.

Regulated voltage nodes $V_{Ca}$, $V_{Cb}$, . . . and $V_{Cn}$ are nodes which are generated by connection of first terminals of the electrical loads 220 and second terminals of the driving current sources 210. In the case where current is supplied from the driving current sources 210 to the electrical loads 220, voltage drops occur due to the presence of the electrical loads 220, and dropped voltages may be sensed through the regulated voltage nodes $V_{Ca}$, $V_{Cb}$, . . . and $V_{Cn}$.

The sensing units 240 include a plurality of diodes 240a, 240b, . . . and 240n which respectively correspond to the diode strings 220a, 220b, . . . and 220n and a reference current source 230. The diodes 240a, 240b, . . . and 240n have first terminals which are respectively connected to the regulated voltage nodes $V_{Ca}$, $V_{Cb}$, . . . and $V_{Cn}$ and second terminals which are respectively connected to the reference current source 230 connected to the feedback line $L_{FB}$.

If the driving current sources 210 supply current to the electrical loads 220 in response to the pulse width modulated control signal PWM, voltage drops occur due to the presence of the diode strings 220a, 220b, . . . and 220n, and dropped voltages are respectively applied to the regulated voltage nodes $V_{Ca}$, $V_{Cb}$, . . . and $V_{Cn}$. At this time, a diode, which is connected to a regulated voltage node with a largest voltage drop, is turned on. That is to say, each diode is turned on when the voltage of a corresponding regulated voltage node is lower than the voltages of the other regulated voltage nodes, and supplies a dropped voltage to the sample-and-hold circuit 250. Therefore, the sensing units 240 can sense a minimum voltage among the voltages applied to the regulated voltage nodes $V_{Ca}$, $V_{Cb}$, . . . and $V_{Cn}$.

The feedback line $L_{FB}$ is a line which commonly connects the second terminals of the respective diodes 240a, 240b, . . . and 240n of the sensing units 240 with the sample-and-hold circuit 250. The minimum voltage sensed by the sensing units 240 may be inputted to the sample-and-hold circuit 250 through the feedback line $LL_{FB}$.

The sample-and-hold circuit 250 is configured to sample and hold the minimum voltage signal inputted through the feedback line $L_{FB}$ in response to the pulse width modulated control signal PWM and output a resultant value to the comparator 260.

In other words, if current is supplied to the electrical loads 220 through the operations of the driving current sources 210 during a period in which the pulse width modulated control signal PWM has a high level, voltage drops occur due to the presence of the electrical loads 220. The sample-and-hold circuit 250 samples the minimum voltage which is sensed by the sensing units 240, through the feedback line $L_{FB}$. According to a comparison result of the comparator 260, the driving voltage $V_{LED}$ for driving the electrical loads 220 is increased or decreased.

A period, in which the pulse width modulated control signal PWM has a low level, becomes a hold period in which the signal inputted during the sampling period is held. In this regard, in the case where the signal inputted in the hold period, that is, the signal held in the sampling period is lower than a reference threshold voltage $V_{RT}$, the driving voltage $V_{LED}$ maintains a previous voltage.

The sample-and-hold circuit 250 increases an output voltage even in the hold period to ensure a stable operation at a low duty, and the comparator 260 with a push-pull function is used so that increasing or decreasing of the driving voltage $V_{LED}$ can be regulated through reinforcing and dampening of current.

The comparator 260 compares the output voltage of the sample-and-hold circuit 250 inputted through the inverting terminal − thereof and the reference threshold voltage $V_{RT}$ inputted through the non-inverting terminal + thereof, and outputs a feedback signal. The feedback signal includes a feedback voltage $V_{FB}$ and a feedback current $I_{FB}$.

When the reference threshold voltage $V_{RT}$ is larger than the output voltage of the sample-and-hold circuit 250 as a result of comparing the output voltage of the sample-and-hold circuit 250 and the reference threshold voltage $V_{RT}$, the comparator 260 supplies the feedback voltage $V_{FB}$ for decreasing the driving voltage $V_{LED}$ to the DC voltage regulator 270. When the reference threshold voltage $V_{RT}$ is smaller than the output voltage of the sample-and-hold circuit 250 as a result of comparing the output voltage of the sample-and-hold circuit 250 and the reference threshold voltage $V_{RT}$, the comparator 260 causes the feedback current $I_{FB}$ for increasing the driving voltage $V_{LED}$ to be discharged to the ground through a current source provided in the comparator 260. The detailed configuration of the comparator 260 will be described in detail with reference to FIG. 3.

The DC voltage regulator 270 includes an input terminal 271 for receiving an input voltage VIN, an output terminal 272 for supplying the driving voltage $V_{LED}$ to the power supply line $L_{LED}$, and a feedback terminal 273 for receiving the feedback voltage $V_{FB}$.

Namely, the DC voltage regulator 270 is configured to receive the input voltage VIN and the feedback voltage $V_{FB}$ and regulate the driving voltage $V_{LED}$ to be supplied to the power supply line $L_{LED}$, to a desired value. As a voltage divider 280 with variable resistors R1 and R2, which are connected in series, is disposed between the power supply line $L_{LED}$ and the feedback terminal 273, the feedback voltage $V_{FB}$ may be easily regulated.

FIG. 3 is a view illustrating an exemplary embodiment of a comparator of the driver IC for electrical loads according to the embodiment of the present invention.

Referring to FIG. 3, the comparator 260 of the driver IC for electrical loads according to the embodiment of the present invention includes a first PMOS transistor 261 which serves as a current source, an operational amplifier 262 which compares the reference threshold voltage $V_{RT}$ with the output voltage of the sample-and-hold circuit 250, and a first NMOS transistor 263 to which the output voltage of the operational amplifier 262 is applied.

The first PMOS transistor 261 has a first terminal which is connected to a power supply voltage VDD and a control terminal to which a bias voltage $V_B$ is applied.

The operational amplifier 262 has a first terminal which is connected to the second terminal of the first PMOS transistor 261 and a second terminal which is connected to the ground. Also, the operational amplifier 262 has an inverting terminal − to which the reference threshold voltage $V_{RT}$ is inputted and a non-inverting terminal + to which the output voltage of the sample-and-hold circuit 250 is applied.

The first NMOS transistor 263 has a first terminal which is connected to the power supply voltage VDD, a second terminal which is connected to the feedback voltage $V_{FB}$, and a control terminal to which the output voltage of the operational amplifier 262 is applied. The first NMOS transistor 263 finally outputs the feedback voltage $V_{FB}$.

A comparator current source 264 may be provided to the second terminal of the first NMOS transistor 263. The comparator current source 264 may be replaced using a biased NMOS transistor.

As a consequence, the comparator 260 operates between the power supply voltage VDD and a ground voltage GND. The comparator 260 compares the output voltage of the sample-and-hold circuit 250 with the reference threshold voltage $V_{RT}$, and outputs and supplies the feedback voltage $V_{FB}$ to the DC voltage regulator 270.

Meanwhile, the driver IC for electrical loads according to the present invention may not have the sample-and-hold circuit 250 as the occasion demands. In other words, the minimum voltage sensed by the sensing units 240 may be directly compared with the reference threshold voltage $V_{RT}$ without passing through a sample-and-hold circuit, and then, the feedback signal may be outputted and supplied to the DC voltage regulator 270.

Also, in the driver IC for electrical loads according to the present invention, branches of the plurality of electrical loads 220 and the plurality of driving current sources 210, which are connected in parallel, may be grouped into predetermined groups G1, G2, G3, . . . .

At this time, a minimum selector (not shown) for selecting a minimum voltage among the grouped groups G1, G2, G3, . . . may be additionally provided. The minimum voltage selected among the grouped groups G1, G2, G3, . . . is compared with the reference threshold voltage $V_{RT}$, and then, the feedback signal may be outputted and supplied to the DC voltage regulator 270.

Figure 4:
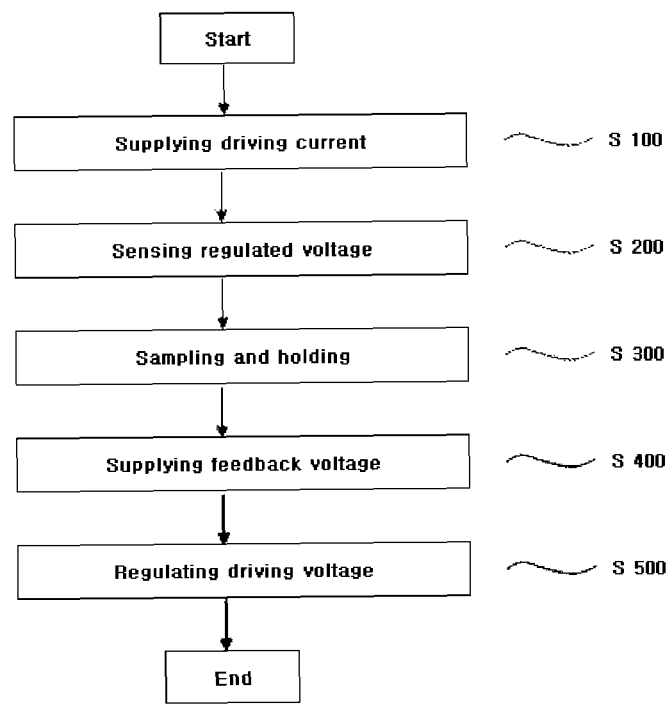
FIG. 4 is a flow chart showing a method for driving electrical loads in accordance with another embodiment of the present invention.

FIG. 4 is a flow chart showing a method for driving electrical loads in accordance with another embodiment of the present invention.

Referring to FIG. 4, a method for driving electrical loads in accordance with another embodiment of the present invention includes a driving current supplying step S100, a regulated voltage sensing step S200, a sampling and holding step S300, a feedback voltage supplying step S400, and a driving voltage regulating step S500.

In the driving current supplying step S100, driving current for driving at least one of the electrical loads 220, which are connected to the power supply line $L_{LED}$, is supplied using at least one of the driving current sources 210. In the regulated voltage sensing step S200, a regulated voltage is sensed from both ends of at least one of the electrical loads 220 or at least one of the driving current sources 210.

In the sampling and holding step S300, an operation of sampling and holding an input signal according to the level of the pulse width modulated control signal PWM is consecutively performed, and a resultant value is outputted to the comparator 260.

In the feedback voltage supplying step S400, the comparator 260 compares the output voltage of the sample-and-hold circuit 250 with the reference threshold voltage $V_{ET}$, and outputs and supplies the feedback voltage $V_{FB}$ to the DC voltage regulator 270.

In the driving voltage regulating step S500, the driving voltage $V_{LED}$ is regulated using the feedback voltage $V_{FB}$ and the input voltage VIN. That is to say, the feedback voltage $V_{FB}$ and a predetermined reference voltage according to the input voltage VIN are compared. When the feedback voltage $V_{FB}$ is lower than the reference voltage, the driving voltage $V_{LED}$ to be supplied to the power supply line $L_{LED}$ is increased, and when the feedback voltage $V_{FB}$ is higher than the reference voltage, the driving voltage $V_{LED}$ to be supplied to the power supply line $L_{LED}$ is decreased. In this way, the driving voltage $V_{LED}$ is regulated.

Hence, unlike the conventional power supply device in which a transistor is disposed at the back end of a comparator, feedback current is dampened when the transistor is turned on and power consumption for reinforcing the dampened feedback current increases, the driver IC for electrical loads in accordance with the embodiment of the present invention has a sample-and-hold circuit which is synchronized with a pulse width modulated signal and uses an output terminal of a comparator, which has a push-pull function, whereby reinforcing and dampening of feedback current is made possible.

The driver IC for electrical loads in accordance with the embodiment of the present invention may be realized in one chip according to a semiconductor integrated circuit technology generally known in the art so that an area occupied by the entire circuit may be reduced.

The driver IC for electrical loads in accordance with the embodiment of the present invention may be applied to driving of an array of, in particular, red, green and blue (RGB) light emitting diodes or single color light emitting diodes. Further, the driver IC for electrical loads in accordance with the embodiment of the present invention may be employed in back lighting of a liquid crystal display, RGB screens of a liquid crystal display, or a lighting application field in which a plurality of array segments including serial circuits of light emitting diodes are used.

As is apparent from the above description, in the present invention, a driver IC for electrical loads has a sample-and-hold circuit synchronized with a pulse width modulated signal to enable a stable operation at a low duty, and reinforcing and damping of current become possible by using an output terminal of a comparator with a push-pull function, thereby reducing power consumption.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. A driver IC for electrical loads, suitable for regulating a driving voltage depending upon a feedback signal and supplying a regulated driving voltage to a power supply line to which load strings are connected in parallel, the driver IC comprising:
    driving current sources respectively connected to the load strings through regulated voltage nodes and configured to supply driving current to the load strings in response to a control signal;
    sensing units configured to sense and output a minimum voltage among voltages of the regulated voltage nodes;
    a sample-and-hold circuit configured to sample, hold and output the minimum voltage in response to the control signal; and
    a comparator configured to compare an output voltage of the sample-and-hold circuit and a reference threshold voltage and generate the feedback signal.

2. The driver IC according to claim 1, wherein the sensing units comprise:
    diodes respectively corresponding to the regulated voltage nodes and connected to the respective regulated voltage nodes and the sample-and-hold circuit; and
    a reference current source connected to the diodes and supply reference current.

3. The driver IC according to claim 1, wherein each of the load strings comprises at least one light emitting diode.

4. The driver IC according to claim 1, wherein each of the driving current sources comprises:
    a resistor having a first terminal which is connected to a ground;
    a differential amplifier having an inverting terminal to which a second terminal of the resistor is connected and a non-inverting terminal to which a reference voltage is applied; and
    a current source transistor having a first terminal which is connected to the second terminal of the resistor, a second terminal which is connected to each of the regulated voltage nodes, and a control terminal to which an output of the differential amplifier is connected.

5. The driver IC according to claim 1, wherein the control signal comprises a pulse width modulated signal.

6. The driver IC according to claim 1,
    wherein, when the reference threshold voltage is larger than the output voltage of the sample-and-hold circuit, the comparator generates a feedback voltage for decreasing the driving voltage, as the feedback signal, and
    wherein, when the reference threshold voltage is smaller than the output voltage of the sample-and-hold circuit, the comparator generates a feedback current for increasing the driving voltage, as the feedback signal.

7. The driver IC according to claim 1, further comprising:
    a DC voltage regulator having an input terminal for receiving an input voltage, an output terminal for supplying the driving voltage to the power supply line, and a feedback terminal for receiving the feedback signal.

8. A driver IC for electrical loads, comprising:
    one or more driving current sources having first terminals which are connected to a ground;
    one or more electrical loads having first terminals which are respectively connected to second terminals of the driving current sources;
    a power supply line connected to second terminals of the electrical loads;
    one or more regulated voltage nodes respectively commonly connected to the first terminals of the electrical loads and the second terminals of the driving current sources;
    one or more diodes having first terminals which are respectively connected to the regulated voltage nodes;
    a feedback line to which second terminals of the diodes are connected;
    a sample-and-hold circuit configured to sample and hold a signal inputted through the feedback line in response to a pulse width modulated control signal;
    a comparator configured to compare an output voltage of the sample-and-hold circuit and a reference threshold voltage and output a feedback signal; and
    a DC voltage regulator having an input terminal for receiving an input voltage, an output terminal for supplying a driving voltage for the electrical loads to the power supply line, and a feedback terminal for receiving the feedback signal.

9. The driver IC according to claim 8, wherein a diode, which is connected to a regulated voltage node with a minimum voltage among the regulated voltage nodes, is turned on.

10. The driver IC according to claim 9, wherein the comparator comprises:
    a first PMOS transistor having a first terminal which is connected to a power supply voltage and a control terminal to which a bias voltage is applied;

an operational amplifier having a first terminal which is connected to a second terminal of the first PMOS transistor, a second terminal which is connected to the ground, an inverting terminal to which the reference threshold voltage is inputted, and a non-inverting terminal to which the output voltage of the sample-and-hold circuit is applied;

a first NMOS transistor having a first terminal which is connected to the power supply voltage and a control terminal to which an output voltage of the operational amplifier is applied; and a comparator current source having a first terminal which is connected to a second terminal of the first NMOS transistor and a second terminal which is connected to the ground.

11. The driver IC according to claim 8, further comprising:

a voltage divider having a first resistor with a first terminal which is connected to the power supply line and a second terminal which is connected to an output of the sample-and-hold circuit, and a second resistor with a first terminal which is connected to the second terminal of the first resistor and a second terminal which is connected to the ground.

12. A method for driving electrical loads, comprising the steps of:

(a) supplying driving current for driving one or more electrical loads which are connected to a power supply line, by using one or more driving current sources;

(b) sensing regulated voltages at both ends of the one or more electrical loads or the one or more driving current sources;

(c) sampling and holding a minimum regulated voltage among one or more regulated voltages acquired in the step (b), by a sample-and-hold circuit in response to a pulse width modulated control signal;

(d) comparing an output voltage of the sample-and-hold circuit with a reference threshold voltage and outputting a feedback signal; and (e) supplying a driving voltage to the power supply line by using an input voltage and the feedback signal.

* * * * *